(12) United States Patent
Jos et al.

(10) Patent No.: US 8,831,066 B2
(45) Date of Patent: Sep. 9, 2014

(54) METHOD AND APPARATUS FOR GENERATING PAIR OF ORTHOGONAL SETS WITH WIDE RANGE OF SPREADING FACTORS

(71) Applicant: Samsung Electronics Co., Ltd., Suwon-si (KR)

(72) Inventors: Sujit Jos, Bangalore (IN); Jinesh P. Nair, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/034,178

(22) Filed: Sep. 23, 2013

(65) Prior Publication Data
US 2014/0023119 A1    Jan. 23, 2014

Related U.S. Application Data

(63) Continuation of application No. PCT/KR2012/010449, filed on Dec. 5, 2012.

(30) Foreign Application Priority Data

Dec. 5, 2011    (IN) .......................... 4233/CHE/2011

(51) Int. Cl.
*H04B 1/00*    (2006.01)
*H04J 13/12*    (2011.01)
*H04B 1/709*    (2011.01)

(52) U.S. Cl.
CPC ............... *H04B 1/709* (2013.01); *H04J 13/12* (2013.01)

USPC ............ 375/140; 375/130; 375/134; 370/208

(58) Field of Classification Search
USPC ................... 375/130, 134, 140; 370/203–211
See application file for complete search history.

(56) References Cited

U.S. PATENT DOCUMENTS

| | | | |
|---|---|---|---|
| 8,059,750 B2 * | 11/2011 | Xin et al. | ....................... 375/298 |
| 2003/0108024 A1 | 6/2003 | Kang | |
| 2005/0237919 A1 | 10/2005 | Pettendorf et al. | |

FOREIGN PATENT DOCUMENTS

WO    WO 2011-082543 A1    7/2011

OTHER PUBLICATIONS

International Search Report issued on Feb. 26, 2013 in counterpart International Application No. PCT/KR2012/0210449 (3 pages, in English).

* cited by examiner

*Primary Examiner* — Curtis Odom
(74) *Attorney, Agent, or Firm* — NSIP Law

(57) ABSTRACT

A method of generating a pair of orthogonal sets with a spreading factor N for a direct sequence spread spectrum communication system, includes selecting a two-level auto-correlation sequence of a period of N−1, the two-level auto-correlation sequence including elements, each of which includes a value of 1 or 0, and obtaining binary sequences based on the two-level autocorrelation sequence. The method further includes obtaining quasi-orthogonal sets based on the two-level autocorrelation sequence and the binary sequences, and generating the pair of the orthogonal sets based on the quasi-orthogonal sets.

21 Claims, 3 Drawing Sheets

METHOD AND APPARATUS FOR GENERATING PAIR OF ORTHOGONAL SETS WITH WIDE RANGE OF SPREADING FACTORS

CROSS-REFERENCE TO RELATED APPLICATIONS

This application is a continuation of International Application No. PCT/KR2012/010449 filed on Dec. 5, 2012, which claims the benefit of Indian Application No. 4233/CHE/2011, filed on Dec. 5, 2011, and Nov. 29, 2012, in the Indian Patent Office, the entire disclosures of which are incorporated herein by reference for all purposes.

BACKGROUND

1. Field

The following description relates to a method and an apparatus for generating a pair of orthogonal sets with a wide range of spreading factors.

2. Description of Related Art

Orthogonal codes have become an integral part of any direct sequence spread spectrum based communication system for communicating over a wireless channel. Typically, one or more sets of codes are generated and provided to a spread spectrum based communication system for assignment to user(s). Here, each set contains codes, which are orthogonal in nature. The orthogonal nature of the codes ensures that different users can communicate over the same channel with a least multiple access interference (MAI). This allows assignment of single or multiple orthogonal codes in a set to the user(s) in the spread spectrum based communication system depending on a user requirement. However, a total number of orthogonal codes in a set that are deployed in a spread spectrum is limited by a processing gain or a spreading factor of the spread spectrum based communication system.

A number of users supported in a typical spread spectrum based multi-user communication system is usually less than a processing gain/spreading factor, and the system is said to be under-loaded. Next generation communication systems call for a higher user capacity than what could be achieved through a conventional under-loaded system. One efficient way to achieve this is by overloading the system with additional codes such that a total number of codes exceeds the spreading factor. Such a system is referred to as an overloaded or oversaturated system, and the channel is referred to as an overloaded channel. Overloading has been considered as an attractive candidate for next generation applications requiring high capacity. The key challenge in designing an overloaded system is to identify codes that can communicate over a spread spectrum channel with minimal interference.

One important application of overloading is to support more number of users than a spreading factor of a system. This feature is included in Code Division Multiple Access (CDMA) standards whereby the extra users are supported with a graceful degradation in a bit error rate (BER). Another aspect of overloading may be to impart scalability and flexibility in a data rate by assigning multiple spreading codes to users as implemented in Multi-Code CDMA. This feature is also extensively used in a scalable sub-band ultra-wideband (S-SUWB) system and an orthogonal frequency-division multiplexing (OFDM) SUWB system.

These systems present energy efficient means of transmitting an ultra-wideband (UWB) signal using sub-band technology for wireless personal area communication. A significant energy saving in such systems comes from orthogonal code based sub-band selection, which obviates the need of individual down conversion and filtering. An enhanced flexibility of resource allocation for multiuser support is addressed in S-SUWB systems by improvising upon scalability in a data rate, a quality of service (QoS), and multiuser support in both uplink and downlink communication. This provision calls for a plurality of orthogonal codes in a transceiver.

A common approach used to generate a pair of orthogonal codesets for overloading employs a scrambling operation. An existing orthogonal set is selected as a first codeset consisting of N codes. Additional M codes of a second codeset are obtained by scrambling the orthogonal set with a random scrambling sequence. The scrambling strategies almost always results in codes with more or less similar cross-correlation values with one another, thereby rendering uniform performance to all the codes. This aspect is favorable only when the system overloading is 100%, which is often not the case in practical systems. Moreover, the majority of existing art addresses a spreading factor of a form $N=2^n$.

Due to abovementioned reasons, it is evident that the existing system does not provide zero interference transmission in synchronous spread spectrum systems using orthogonal codes in overloaded systems since a total number of available orthogonal codes is limited to a spreading factor. There is a need for a method to employ diverse spreading factors codes such that a mutual interference is as low as possible.

SUMMARY

In one general aspect, there is provided a method of generating a pair of orthogonal sets with a spreading factor N for a direct sequence spread spectrum communication system, the method including selecting a two-level autocorrelation sequence of a period of N−1, the two-level autocorrelation sequence including elements, each of which includes a value of 1 or 0, and obtaining binary sequences based on the two-level autocorrelation sequence. The method further includes obtaining quasi-orthogonal sets based on the two-level autocorrelation sequence and the binary sequences, and generating the pair of the orthogonal sets based on the quasi-orthogonal sets.

In another general aspect, there is provided an apparatus that generates a pair of orthogonal sets with a spreading factor N in a direct sequence spread spectrum communication system, the apparatus including a processing unit configured to select a two-level autocorrelation sequence of a period of N−1, the two-level autocorrelation sequence including elements, each of which includes a value 1 or 0, and obtain binary sequences based on the two-level autocorrelation sequence. The processing unit is further configured to obtain quasi-orthogonal sets based on the two-level autocorrelation sequence and the binary sequences, and generate the pair of the orthogonal sets based on the quasi-orthogonal sets.

Other features and aspects will be apparent from the following detailed description, the drawings, and the claims.

DETAILED DESCRIPTION

Figure 1:
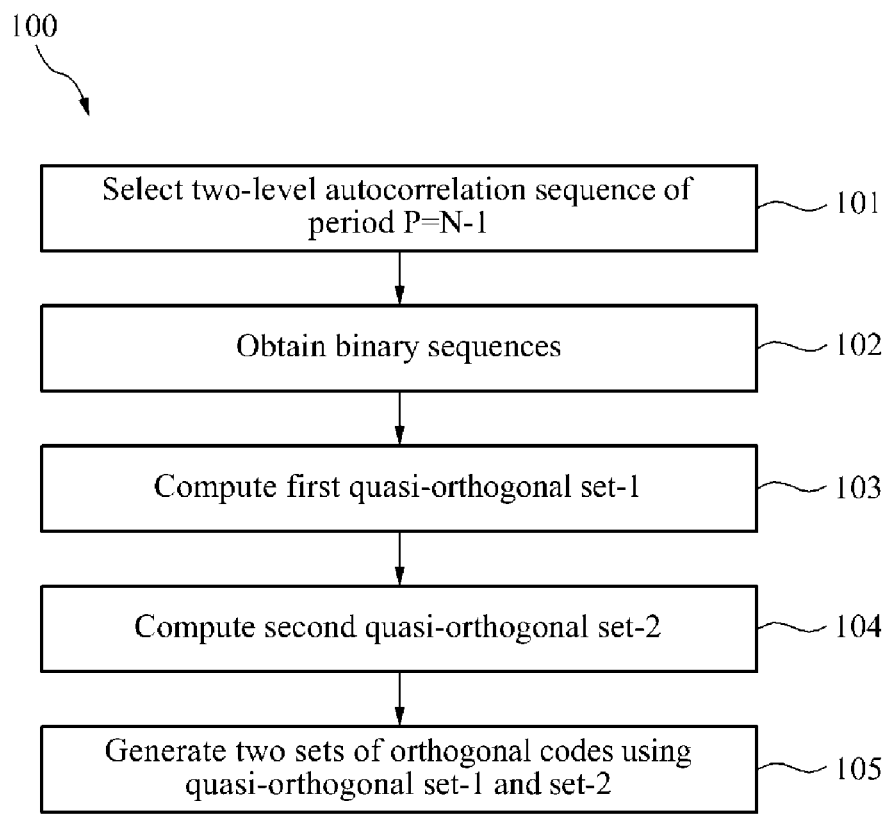
FIG. 1 is a flowchart illustrating an example of a method of generating orthogonal codes.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Examples of a method and an apparatus described may construct a pair of orthogonal codesets of diverse spreading factors. The method may employ a Gold-set construction method of generating orthogonal codes in each of the codesets. Each of the codesets may include N orthogonal codes of a spreading factor N starting with a single two-level autocorrelation sequence of a period P=N−1. The method may span all of possible spreading factors or periods for which the two-level autocorrelation sequence of the period P=N−1 exists. The method may use a single binary sequence with a two-level autocorrelation property in conjunction with two sequences obtained from the two-level autocorrelation sequence.

The proposed method may generate two orthogonal codesets of orthogonal codes with a good flexibility on a choice of a processing gain. The spreading factor may span all of values for which a corresponding two-level autocorrelation sequence exists. This may give a flexibility of designing the processing gain of a system. A distribution of cross-correlation values among the codes may not be uniform. Hence, some codewords may perform better compared to other codewords in a codeset. This may give an option to overload a system with best available codes so long as M<N, where M is additional users in excess to a spreading factor N overloading the system. None of the two orthogonal codesets may include codeword with a single polarity. The orthogonal codes, such as Walsh-Hadamard and sets generated using circular shifts of two-level autocorrelation sequences, include a codeword of all ones/zeros, which may not be useful to spread a data signal. This may enable a use of all of the codes of a given orthogonal set for deployment in spread spectrum systems.

The following paragraphs explain some terms that are frequently used in the description.

Cross-Correlation

Cross-correlation is indicative of a similarity between two different signals. Cross-correlation functions may be of a periodic type or an aperiodic type. Mathematically, a periodic cross-correlation between two binary sequences $c_k$ and $c_j$ with elements from a set $\{1\text{-}1\}$ at a delay $\tau$ may be represented as the following example of Equation 1:

$$R_{k,j}(\tau) = \sum_{n=0}^{N-1} c_k(n) c_j(n+\tau) \tag{1}$$

If the sequences are represented in binary, i.e., with elements from a set $\{0,1\}$, then the cross-correlation may be represented as the following example of Equation 2:

$$R_{k,j}(\tau) = \sum_{n=0}^{N-1} (-1)^{c_k(n) \oplus c_j(n+\tau)} \tag{2}$$

In Equations 1 and 2, N is a length of the sequences.

When k=j, the above equation becomes an autocorrelation function.

Two-Level Autocorrelation Sequence

Let R(k) be a periodic autocorrelation at a delay k. A binary sequence satisfying the following example of Equation 3 is said to be a two-level autocorrelation sequence:

$$R(k) = \begin{cases} N & \text{if } k = 0 \\ -1 & \text{if } 0 < k < N \end{cases} \tag{3}$$

Left Shift Operation

Let $a_i$ be a binary sequence given by the following example of Equation 4:

$$a_i = a_0, a_1, a_2, \tag{4}$$

Then, a left shift operation of the above binary sequence by g results in $a_{i+g}$ may be given by the following example of Equation 5:

$$a_{i+g} = L^g(a_i) = a_g, a_{g+1}, a_{g+2}, \tag{5}$$

In Equation 5, an operator $L^g$ is called a left shift by g operator.

Quasi-Orthogonal Codeset

Let $A_P = \{a_0, a_1, a_2, \ldots, a_{P-2}, a_{P-1}\}$ be a binary set including P binary sequences, each of which including a period P and being arranged such that a sequence $a_i$ represents an $i^{th}$ row of a matrix $A_P$. If for $a_j, a_k \in A_P$, a cross-correlation $R_{i,j} = -1$, then the set $A_P$ is called a quasi-orthogonal set of an order P.

FIG. 1 is a flowchart illustrating an example of a method 100 of generating orthogonal codes. The method 100 produces two orthogonal codesets of the orthogonal codes. Each of the orthogonal codesets includes N orthogonal codes of a spreading factor N, starting with a single two-level autocorrelation sequence of a period P=N−1. The method 100 spans all of possible spreading factors or periods for which the two-level autocorrelation sequence of the period P=N−1 exists.

In operation 101, a two-level autocorrelation sequence $s_i$ of a period P=N−1 with elements from a set $\{1, 0\}$ is initially-selected. The two-level autocorrelation sequence is characterized with an out-of-phase, un-normalized, periodic autocorrelation value of −1, as described above.

In operation 102, two binary sequences $a_i$ and $b_i$ are obtained. In more detail, the sequence $a_i$ of all zeros with the same period as the two-level autocorrelation sequence $s_i$ is obtained. The sequence $b_i$ is obtained as a sequence that gives a minimum value of a peak cross-correlation with sum sequences $s_i \oplus L^g(s_i)$, k=1, ..., N−2 and also with a sequence of all 1's of the same period. The sum sequences are bit-by-bit XOR'ed sums of the two-level autocorrelation sequence with its respective N−2 circularly-shifted versions.

For example, let $s_i=1001011$ be a Pseudo Noise (PN) sequence of a period of 7. The sequence includes 6 sum sequences as given in the following example of Equation 6:

$$s_i \oplus L^1(s_i)=1001011 \oplus 0010111=1011100$$

$$s_i \oplus L^2(s_i)=1001011 \oplus 0101110=1100101$$

$$s_i \oplus L^3(s_i)=1001011 \oplus 1011100=0010111$$

$$s_i \oplus L^4(s_i)=1001011 \oplus 0111001=1110010$$

$$s_i \oplus L^5(s_i)=1001011 \oplus 1110010=0111001$$

$$s_i \oplus L^6(s_i)=1001011 \oplus 1100101=0101110 \qquad (6)$$

In operation 103, a first quasi-orthogonal set 1 ("set-1") is computed as represented as the following example of Equation 7:

$$S_k^1=\{L^k(s_i), k=0,1,\ldots N-2\} \qquad (7)$$

In operation 104, a second quasi-orthogonal set 2 ("set-2") is computed as represented as the following example of Equation 8:

$$S_k^2=\{b_i \oplus L^k(s_i), k=0,1,\ldots, N-2\} \qquad (8)$$

For any $a_j, a_k \in S_k^t$, $t \in \{1,2\}$, a cross-correlation $R_{i,j}=-1$. Hence, each of the quasi-orthogonal sets 1 and 2 ($S_k^t$, $t \in \{1, 2\}$), is a quasi-orthogonal codeset. In addition, each zero in the quasi-orthogonal sets 1 and 2 ($S_k^1$ and $S_k^2$, or $\{S_k^t\}$, $t \in \{1,2\}$) is replaced with −1.

In operation 105, the two sets of the orthogonal codes are generated using the quasi-orthogonal sets 1 and 2. In more detail, a column of 1's is appended to each of the quasi-orthogonal sets 1 and 2. This results in each of the updated two quasi-orthogonal sets including dimensions N−1 by N.

To the updated two quasi-orthogonal sets generated previously, a row $g_i=\mathrm{Prod}(S_k^t)$, $t \in \{1,2\}$ is appended. Each element of $g_i$ is a product of all elements in a corresponding column. This results in the two orthogonal set including N codes, each of which is a period N. Then, a first column of the quasi-orthogonal set 2 ($S_k^2$) is inverted if a sign of the peak cross-correlation of the binary sequence $b_i$ with the N−2 sum sequences of the two-level autocorrelation sequence is positive.

The resulting orthogonal sets may be denoted by $X_k^t$, $t \in \{1, 2\}$. k indicates a $k^{th}$ codeword (row) in a chosen codeset of the orthogonal sets $X_k^t$, $t \in \{1,2\}$.

The various operations in the method 100 may be performed in the order presented, in a different order, or simultaneously. Further, in some examples, some operations listed in FIG. 1 may be omitted.

Figure 2:
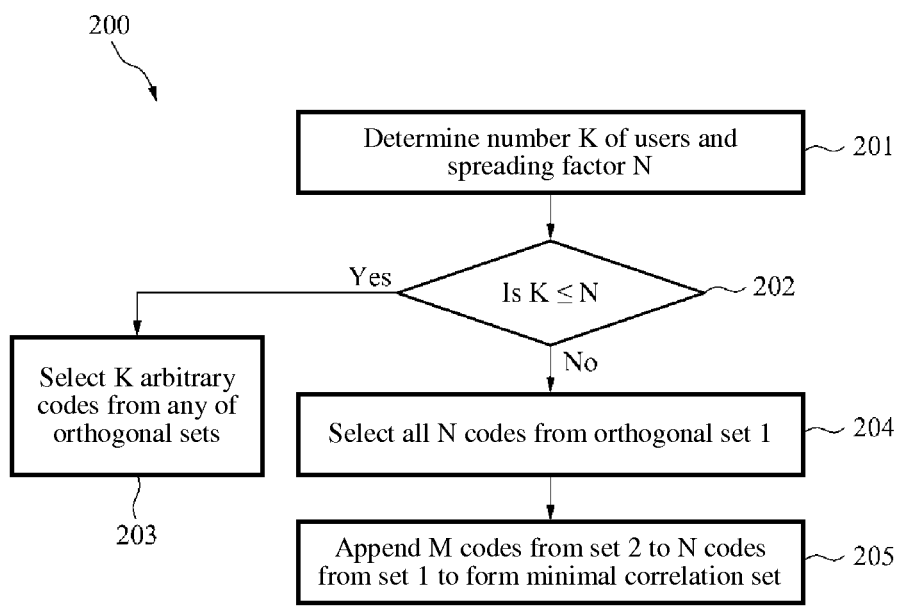
FIG. 2 is a flowchart illustrating an example of a method of selecting a code.

FIG. 2 is a flowchart illustrating an example of a method 200 of selecting a code. In operation 201, a number K of users and a spreading factor N are determined. The users communicate over a channel.

In operation 202, it is determined whether the number K of users is less than or equal to the spreading factor N. If the number K of users communicating over the channel is less than or equal to the spreading factor N, the method 200 continues in operation 203. Otherwise, the method 200 continues in operation 204.

In operation 203, K arbitrary codes are selected from any of two orthogonal sets 1 and 2 ($X_k^1$ and $X_k^2$). For example, the K arbitrary codes may be selected from 2N orthogonal codes in the two orthogonal sets $X_k^1$ and $X_k^2$.

In operation 204, all N codes are selected from the orthogonal set 1 ($X_k^1$).

In operation 205, for a given overloading M, M codes from N codes of the orthogonal set 2 ($X_k^2$) are appended to the N codes from the orthogonal set 1, to form a minimal correlation set $X_k^{min}$ such that a total-squared correlation (TSC) is minimum. A subscript k in $X_k^{min}$ denotes a $k^{th}$ codeword in the minimal correlation set $X_k^{min}$, where k ranges from 0 to K−1. The TSC may be represented as the following example of Equation 9:

$$TSC = \sum_{i=1}^{K} \sum_{j=1}^{K} (R_{i,j})^2 \qquad (9)$$

In Equation 9, $R_{k,j}$ is a cross-correlation between $X_i^{min}$ and $X_j^{min}$, i≠j.

The various operations in the method 200 may be performed in the order presented, in a different order, or simultaneously. Further, in some examples, some operations listed in FIG. 2 may be omitted.

Figure 3:
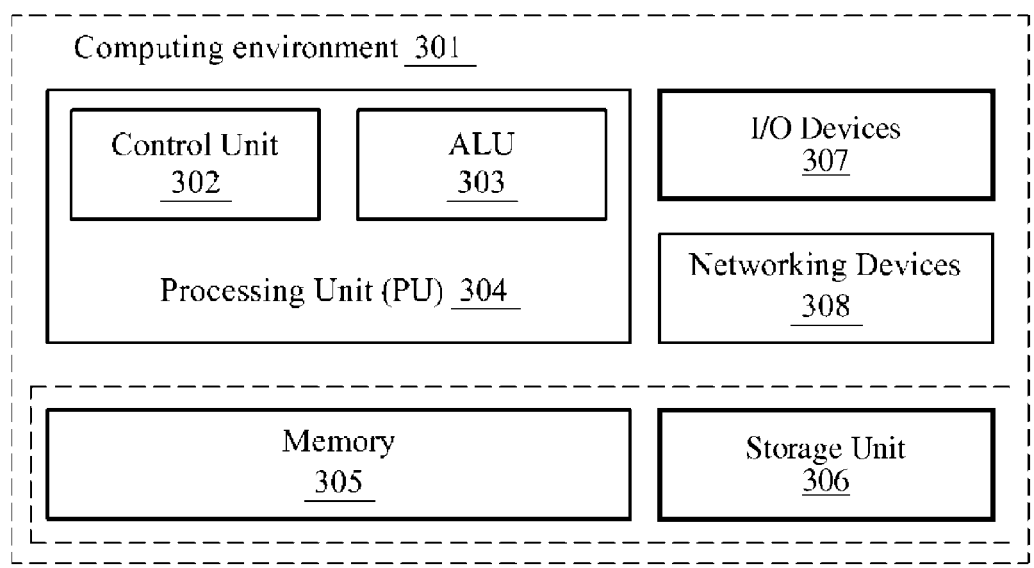
FIG. 3 is a block diagram illustrating an example of a computing environment implementing a method of generating two sets of orthogonal codes.

FIG. 3 is a block diagram illustrating an example of a computing environment 301 implementing a method of generating two sets of orthogonal codes. As depicted, the computing environment 301 or an apparatus includes at least one processing unit (PU) 304 including a control unit 302 and an Arithmetic Logic Unit (ALU) 303, a memory 305, a storage unit 306, networking devices 308 and Input output (I/O) devices 307.

In examples, the apparatus may be a stand-alone chip, an integrated circuit (IC), a Silicon on Chip (SoC), and/or other devices known to one of ordinary skill in the art, which include a processor and a memory coupled to the processor. The memory includes a code generator. The code generator generates the two sets of the orthogonal codes, each of which includes N orthogonal codes of a period N, where N is a spreading factor of a spread spectrum based communication system.

The processing unit 304 processes instructions of the method of generating the two sets of the orthogonal codes, e.g., as described in FIGS. 1-2. The processing unit 304 receives commands from the control unit 302 in order to perform its processing. Further, any logical and arithmetic operations involved in the execution of the instructions are computed with the help of the ALU 303.

The overall computing environment 301 may include multiple homogeneous and/or heterogeneous cores, multiple CPUs of different kinds, media, and/or other accelerators. Further, the processing unit 304 may be located on a single chip or over multiple chips.

The method of generating the two sets of the orthogonal codes including the instructions and codes needed for the implementation is stored in either the memory 305 and/or the storage unit 306. At a time of execution, the processing unit 304 may fetch and execute the instructions from the corresponding memory 305 and/or storage unit 306. In any hardware implementations, the various networking devices 308 and/or external I/O devices 307 may be connected to the computing environment 301 to support the implementation through a networking unit and an I/O device unit.

The various units and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating a pair of orthogonal codesets with a spreading factor N for a direct sequence spread spectrum communication system, the method comprising:

selecting a two-level autocorrelation sequence of a period of N−1, the two-level autocorrelation sequence comprising elements, each of which comprises a value of 1 or 0;
obtaining binary sequences based on the two-level autocorrelation sequence;
obtaining quasi-orthogonal codesets based on the two-level autocorrelation sequence and the binary sequences; and
generating the pair of the orthogonal codesets based on the quasi-orthogonal codesets,
wherein at least one of the selecting, the obtaining of the binary sequences, the obtaining of the quasi-orthogonal codesets, and the generating is performed by a processor.

2. The method as in claim 1, wherein the obtaining of the binary sequences comprises:
obtaining a first binary sequence, among the binary sequences, that comprises all zeros with the period of N−1.

3. The method as in claim 2, wherein the obtaining of the binary sequences comprises:
obtaining a second binary sequence, among the binary sequences, that gives a minimum value of a peak cross-correlation with N−2 sum sequences of the two-level autocorrelation sequence and with a sequence comprising all 1's with the period of N−1.

4. The method as in claim 3, wherein each of the sum sequences comprises an XOR of the two-level autocorrelation sequence with a respective one of N−2 circularly-shifted versions of the two-level autocorrelation sequence.

5. The method as in claim 3, wherein the obtaining of the quasi-orthogonal codesets comprises:
obtaining a first set of the quasi-orthogonal codesets that comprises a matrix of N−1 rows and N−1 columns, each of the rows being an XOR of the first binary sequence with a respective one of N−1 cyclic-shifted versions of the two-level autocorrelation sequence;
obtaining a second set of the quasi-orthogonal codesets that comprises a matrix of N−1 rows and N−1 columns, each of the rows being an XOR of the second binary sequence with a respective one of N−1 cyclic-shifted versions of the two-level autocorrelation sequence; and
replacing each zero in each of the quasi-orthogonal codesets with −1.

6. The method as in claim 1, wherein each of the orthogonal codesets comprises an N number of orthogonal codes.

7. The method as in claim 1, wherein the generating of the pair of the orthogonal codesets comprises:
appending a column of all 1's to each of the quasi-orthogonal codesets to update the quasi-orthogonal codesets, each of which comprises a matrix of N−1 rows and N columns.

8. The method as in claim 7, wherein the generating of the pair of the orthogonal codesets further comprises:
appending a row to each of the updated quasi-orthogonal codesets to generate the pair of the orthogonal codesets, each of elements of the row comprising a product of all elements in a respective column; and
inverting a first column of a second set of the quasi-orthogonal codesets in response to a sign of a peak cross-correlation of a second binary sequence, among the binary sequences, with N−2 sum sequences of the two-level autocorrelation sequence being positive.

9. The method as in claim 1, further comprising:
determining whether a number K of users is less than or equal to the spreading factor N.

10. The method as in claim 9, further comprising:
selecting K codes from any of the orthogonal codesets in response to the number K of the users being determined to be less than or equal to the spreading factor N.

11. The method as in claim 9, further comprising, in response to the number K of the users being determined to be greater than the spreading factor:
selecting all N codes from a first set of the orthogonal codesets; and
appending M codes from a second set of the orthogonal codesets to the N codes such that a total squared correlation is minimum.

12. An apparatus that generates a pair of orthogonal codesets with a spreading factor N in a direct sequence spread spectrum communication system, the apparatus comprising:
a processing unit configured to
select a two-level autocorrelation sequence of a period of N−1, the two-level autocorrelation sequence comprising elements, each of which comprises a value 1 or 0,
obtain binary sequences based on the two-level autocorrelation sequence,
obtain quasi-orthogonal codesets based on the two-level autocorrelation sequence and the binary sequences, and
generate the pair of the orthogonal codesets based on the quasi-orthogonal codesets.

13. The apparatus as in claim 12, wherein the processing unit is further configured to:
obtain a first binary sequence, among the binary sequences, the first binary sequence comprising all zeros with the period of N−1.

14. The apparatus as in claim 13, wherein the processing unit is further configured to:
obtain a second binary sequence, among the binary sequences, that gives a minimum value of a peak cross-correlation with N−2 sum sequences of the two-level autocorrelation sequence and with a sequence comprising all 1's with the period of N−1.

15. The apparatus as in claim 14, wherein the processing unit is further configured to:
obtain a first set of the quasi-orthogonal codesets that comprises a matrix of N−1 rows and N−1 columns, each of the rows being an XOR of the first binary sequence with a respective one of N−1 cyclic-shifted versions of the two-level autocorrelation sequence;
obtain a second set of the quasi-orthogonal codesets that comprises a matrix of N−1 rows and N−1 columns, each of the rows being an XOR of the second binary sequence with a respective one of N−1 cyclic-shifted versions of the two-level autocorrelation sequence; and
replace each zero in each of the quasi-orthogonal codesets with −1.

16. The apparatus as in claim 12, wherein each of the orthogonal codesets comprises an N number of orthogonal codes.

17. The apparatus as in claim 12, wherein the processing unit is further configured to:
append a column of all 1's to each of the quasi-orthogonal codesets to update the quasi-orthogonal codesets, each of which comprises a matrix of N−1 rows and N columns.

18. The apparatus as in claim 17, wherein the processing unit is further configured to:
append a row to each of the updated quasi-orthogonal codesets to generate the pair of the orthogonal codesets, each of elements of the row comprising a product of all elements in a respective column; and invert a first column of a second set of the quasi-orthogonal codesets in response to a sign of a peak cross-correlation of a second binary sequence, among the binary sequences, with N−2 sum sequences of the two-level autocorrelation sequence being positive.

19. The apparatus as in claim 12, wherein the processing unit is further configured to:

determine whether a number K of users is less than or equal to the spreading factor N.

20. The apparatus as in claim 19, wherein the processing unit is further configured to:

select K codes from any of the orthogonal codesets in response to the number K of the users being determined to be less than or equal to the spreading factor N.

21. The apparatus as in claim 19, wherein the processing unit is further configured to, in response to the number K of the users being determined to be greater than the spreading factor:

select all N codes from a first set of the orthogonal codesets; and append M codes from a second set of the orthogonal codesets to the N codes such that a total squared correlation is minimum.

\* \* \* \* \*